Aug. 8, 1950  J. VAN H. WHIPPLE ET AL  2,518,209
PICTURE PROJECTOR

Filed July 30, 1947  7 Sheets-Sheet 1

INVENTORS
JACK VAN H. WHIPPLE
BY GERALD P. KAMMERER

Blair, Curtis & Hayward
ATTORNEYS

Aug. 8, 1950   J. VAN H. WHIPPLE ET AL   2,518,209
PICTURE PROJECTOR

Filed July 30, 1947   7 Sheets-Sheet 2

Fig. 3

INVENTORS
JACK VAN H. WHIPPLE
BY GERALD P. KAMMERER
Blair, Curtis & Hayward
ATTORNEYS Aug. 8, 1950     J. VAN H. WHIPPLE ET AL     2,518,209
PICTURE PROJECTOR Filed July 30, 1947     7 Sheets-Sheet 4

INVENTORS
JACK VAN H. WHIPPLE
BY GERALD P. KAMMERER

Blair, Curtis & Hayward
ATTORNEYS

Aug. 8, 1950　　J. VAN H. WHIPPLE ET AL　　2,518,209
PICTURE PROJECTOR

Filed July 30, 1947　　7 Sheets-Sheet 5

INVENTORS
JACK VAN H. WHIPPLE
BY　GERALD P. KAMMERER

Blair, Curtis & Hayward
ATTORNEYS

Aug. 8, 1950 J. VAN H. WHIPPLE ET AL 2,518,209
PICTURE PROJECTOR
Filed July 30, 1947 7 Sheets-Sheet 6

INVENTORS
JACK VAN H. WHIPPLE
BY GERALD P. KAMMERER
Blair, Curtis & Hayward
ATTORNEYS Aug. 8, 1950 J. VAN H. WHIPPLE ET AL 2,518,209
PICTURE PROJECTOR
Filed July 30, 1947 7 Sheets-Sheet 7

FIG.11

INVENTORS
JACK VAN H. WHIPPLE
GERALD P. KAMMERER
BY
Blair, Curtis & Hayward
ATTORNEYS Patented Aug. 8, 1950

2,518,209

UNITED STATES PATENT OFFICE 2,518,209

PICTURE PROJECTOR

Jack Van H. Whipple, New York, and Gerald P. Kammerer, Floral Park, N. Y.

Application July 30, 1947, Serial No. 764,877

11 Claims. (Cl. 88—24)

This invention relates to a photographic film projector, and more particularly to a projector adapted to project on a self-contained screen information and data of the nature of that printed in a directory such as, for example, a hotel directory.

The conventional business directory for example, a hotel directory, customarily comprises a bound volume including a substantial number of pages on which is printed information concerning the establishments of the advertising subscribers. Thus any given page may include a substantial number of single line entries, some of which may be in bold face type, a quarter page entry including perhaps an illustration, and a half page entry giving detailed information of the subscriber's hotel. Then, of course, a relatively small number of subscribers will take a full page. In any event, the type used is usually relatively fine, line entries are difficult to locate and read, the directory is bulky and accordingly clumsy to handle, its pages become torn, and, in general, it is an inefficient medium for its purpose. Other types of directories have similar disadvantages.

In so far as we have been able to determine, there are no commercially available projectors which, with or without modification, are capable of projecting photographically reproduced information and data of the above nature. The conventional motion picture projector is inadequate because of its inherent film transport speed limitations, its typical intermittent film transport, and others that are equally serious. The well-known projector for slides is obviously useless for directory purposes when it is borne in mind that a single strip of film must include all the information in a printed directory.

It is accordingly among the objects of this invention to provide a projector of simple, rugged and inexpensive construction capable of projecting directory information and data or the like in a manner that makes such subject matter more readily available and readable than it is from a printed volume. Another object is to provide a projector of the above nature that is so simple to operate that the uninstructed layman can readily use it to obtain the information he desires. A further object is to provide in such a projector means for running the film forward or backward at widely varying rates of speed. A still further object is to provide such a projector wherein an indicator is automatically actuated in synchronism with the film to indicate to the operator at any instant what portion of the film is being projected while the film is moving. Other objects will be in part obvious and in part pointed out hereinafter.

In the drawing, wherein there is shown one form of the invention.

Similar reference characters refer to similar parts throughout the views of the drawing.

GENERAL DESCRIPTION

In accordance with one form of the invention, the projector is adapted to accommodate any standard size motion picture film, for example, standard 35 mm. film, the images on which are projected by a lens of relatively short focal length to give a magnification of the order of 10 to 1, for example, on a screen of suitable size, illustratively an 8 x 10 screen. The film to be projected differs from a conventional film in that it has no set frames on it, i. e. it appears as one continuous exposure. The film is mounted on a pair of reels rotatably mounted within the projector housing, these reels being connected by a chain and sprocket drive operatively connected to a transmission which is driven by a reversible electric motor. A manually operable control is provided to control not only the direction of operation of the motor, but also the speed of operation thereof, this control also being operable to control a transmission so that the film may be fed forward or backward through the optical system, over a wide range of speeds, illustratively from a slow tracking speed of the order of 1" per minute, to a speed of 600' per minute. Also driven by the sprocket is an indexing director which is synchronized with the film drive so that as the user operates the projector at high speed, he can determine which portion of the film is passing on the screen by noting the position of a pointer on the indexing director. Thus when the operator approaches the desired portion on the indexing director, he can operate the control to reduce the film speed down to its tracking rate, which is slow enough to enable him to stop the film at the portion thereof that includes the information and data he is seeking.

The operating mechanism and the optical system are disposed within a housing comprising a base and detachable hood fastened to the base in semi air-tight and dust-proof relation. In the base are secured a plurality of rollers adapted to ride on a track whereby the projector can be rotated through 360° to facilitate its use.

PROJECTOR HOUSING

*(Figures 1, 2, 3, 4, 5 and 9)*

Figure 1:
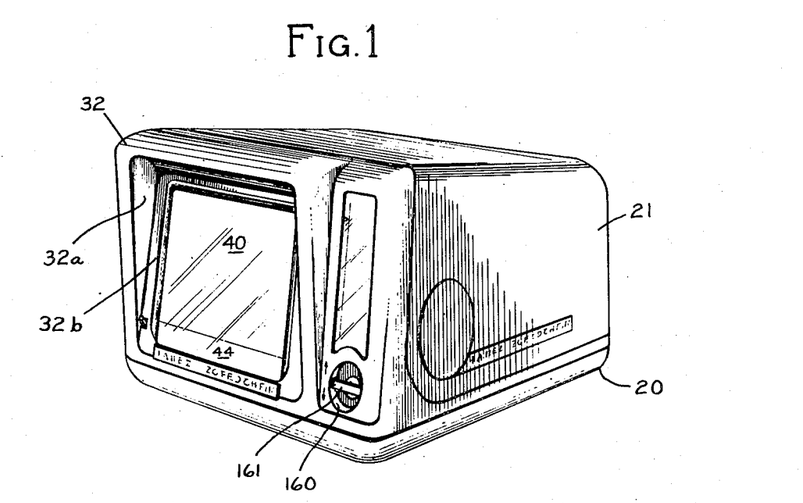
Figure 1 is a perspective view of the projector showing the front, top and one side thereof.
Figure 2:
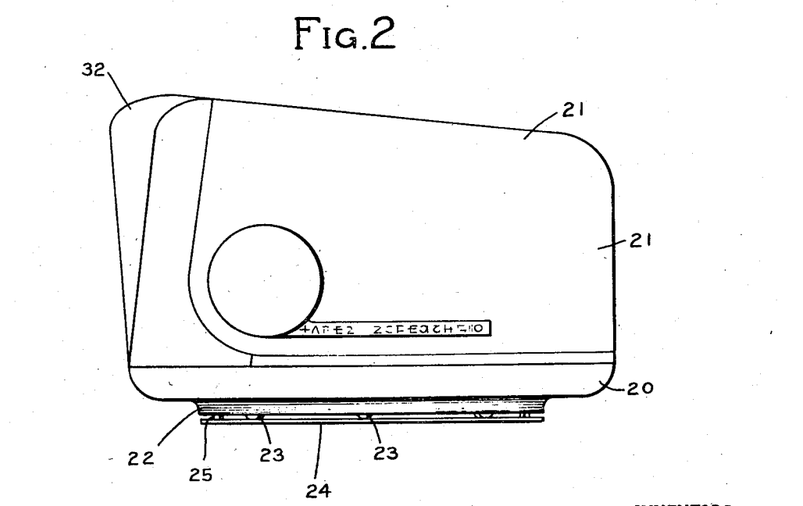
Figure 2 is a side view of the projector.

As shown in Figures 1 and 2, the projector housing comprises a base 20 and a hood 21. As is better shown in Figures 3 and 5, base 20 includes a downwardly extending annular projection 22, within and on which are rotatably mounted in any suitable manner, illustratively, six rollers 23. These rollers ride on a flat circular track 24, about the periphery of an annular upwardly extending guide rail 25 which is preferably integral with track 24.

Figure 9:
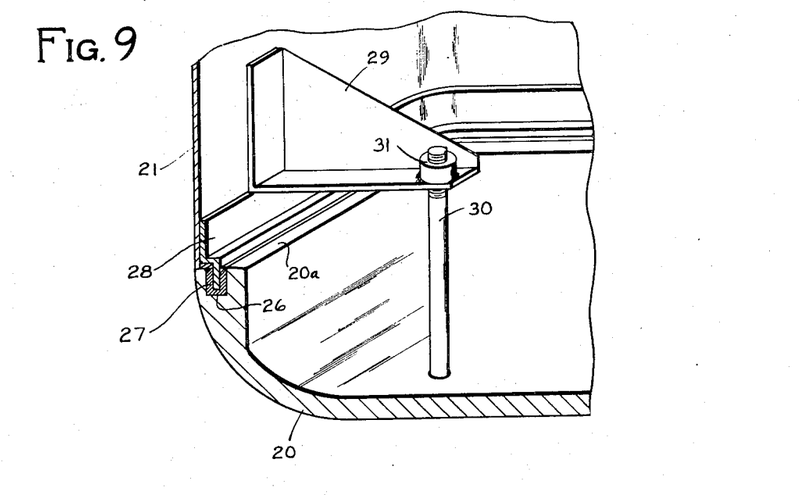
Figure 9 is an enlarged fragmentary sectional perspective of the base and hood of the projector, showing the dust-proof seal between the base and the hood and the attaching means therebetween.

As shown in Figure 9, the edge 20a of base 20 is grooved, at as 26, and in this groove is disposed a rubber gasket 27 which is U-shaped in cross section. This gasket receives the downwardly extending portion of a sealing strip 28 which is secured in any suitable manner to the inside of hood 21 adjacent the lower edge thereof. Also secured to the inside of hood 20 are a suitable number of brackets 29, each adapted by means of an internally threaded boss 31 to receive the similarly threaded upper end of a machine bolt 30 extending through the bottom of base 20. As each of these bolts 30 is threaded into bosses 31, they fasten brackets 29, and accordingly hood 21, to base 20, thus joining the base and hood together in substantially air-tight and dust-proof relation.

Hood 20 includes a front panel section 32 (Figure 3) which is preferably permanently secured to base 20. As is better shown in Figure 5, panel 32 is also grooved as at 33 to receive a U-shaped gasket 34 similar to gasket 27. This gasket 34 accordingly receives the projecting edge 35 (Figure 3) of a sealing strip 36, secured to the inside of hood 21 so as to seal this portion of the hood where it joins panel 32.

The rear wall 21a (Figure 3) of hood 21 is suitably apertured to receive a lamp housing 37, the lamp housing including a flange 38 which is secured to hood wall 21a as by screws 39, a suitable gasket or sealing agent being disposed between flange 38 and the hood wall to preclude entrance of air or dust therebetween. The removable back plate 37a of lamp housing 37 is suitably louvered to permit air circulation.

Figure 5:
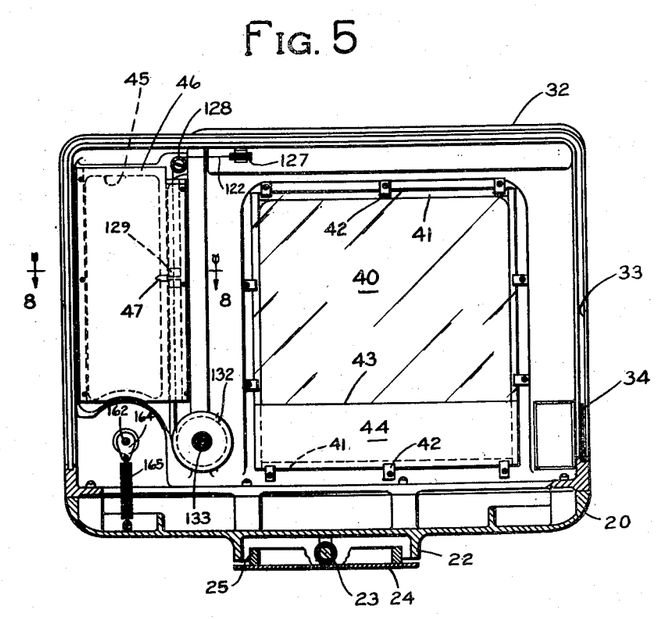
Figure 5 is a sectional elevation taken along the line 5—5 of Figure 3.

As shown in Figure 5, panel section 32 of the hood has secured therein a screen 40, this screen being held tight by clamps 42 against gaskets 41 which surround the aperture in panel 32. Clamps 42 are readily removable for replacement of the screen and gaskets as desired, or necessary. Screen 40 is preferably of glass, is frosted, and is translucent from its top down to line 43. From line 43 to the bottom, the screen is clear and transparent, as in the area 44. Thus portion 44 of the screen allows for printed matter or other information to be attached to the back of the screen in the inside of the projector so as to be visible from the outside.

As shown in Figure 1, hood panel 32 is angularly recessed as at 32a, thus providing an inclined face 32b, the plane of which defines the plane of screen 40. Thus screen 40 is inclined to facilitate viewing thereof by the operator of the projector. Referring back to Figure 5, panel 32 is apertured as at 45, and has detachably secured thereto an index card 46 which is readily visible through the aperture from the outside of the projector. This index card 46 comprises a portion of the indexing director and may designate, in the case of hotel directory use, the several United States, for example. As the projector is operated, a pointer 47 travels up or down index card 46 in synchronism with the moving film within the projector so that the operator can determine what portion of the rapidly moving film is being projected on the screen, all as will be described in greater detail hereinafter. Under certain circumstances, it may be desirable to dispose within the projector housing suitable means for controlling the humidity therein. We have generally indicated such means at 300 in Figure 4.

FILM SUPPORT

*(Figures 3, 4 and 7)*

As noted hereinbefore, while the film used in our projector may be standard, it differs from the conventional motion picture film in that it has no delineated frames, but rather appears as one continuous exposure. Accordingly we are able to dispense with the typical claw intermittent film feed and may use on the other hand a simple but yet efficient film supporting and driving structure, as will now be described.

Figure 3:
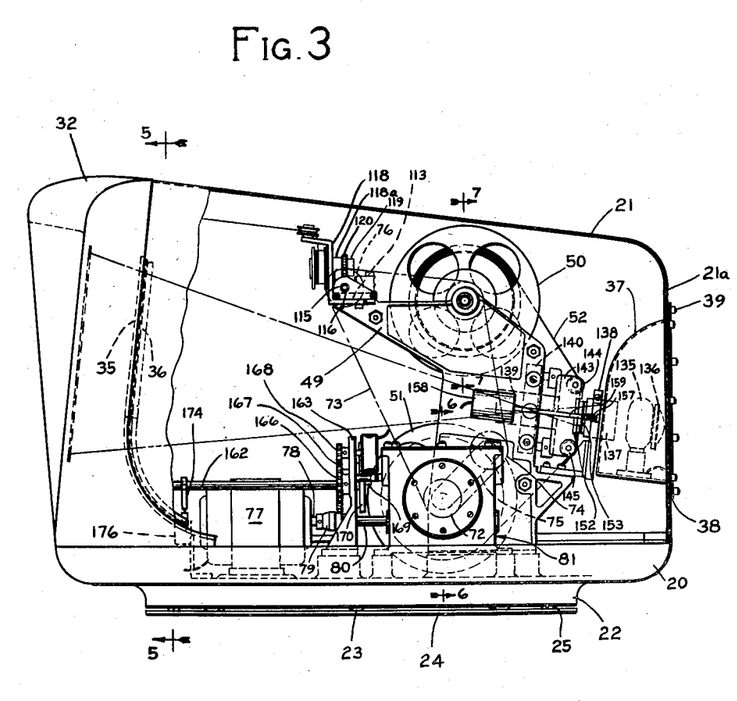
Figure 3 is an enlarged side elevation of the projector with the hood partially cut away.
Figure 4:
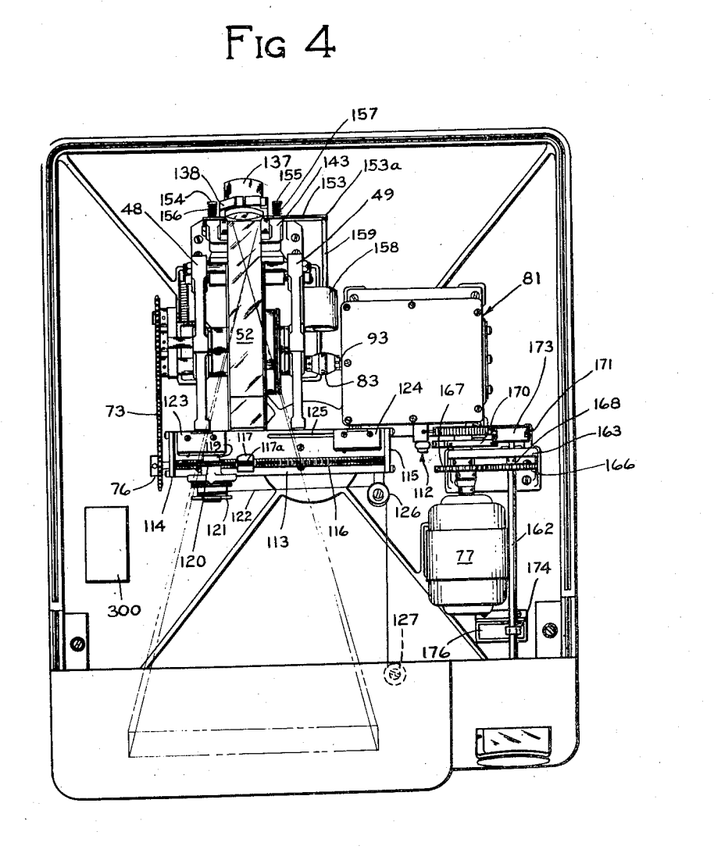
Figure 4 is a plan view of the projector with the hood and lamp housing removed.

As shown in Figure 4, a pair of reel supporting frames 48 and 49 are secured to base casting 20 in any suitable manner from which they project upwardly, as shown in Figure 3, into hood 21. Rotatably supported between these frames are a pair of film reels 50 and 51, to which are connected the opposite ends of film 52. As reels 50 and 51 are substantially identical, a detailed description of reel 50 will suffice.

Figure 7:
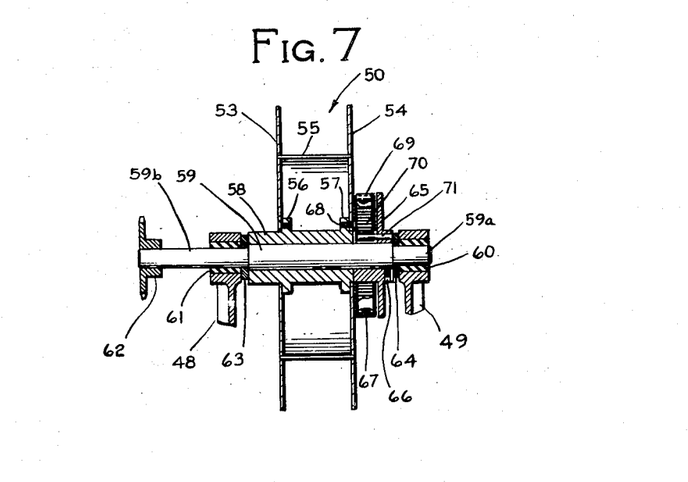
Figure 7 is an enlarged fragmentary sectional elevation taken along the line 7—7 of Figure 3.
Figure 8:
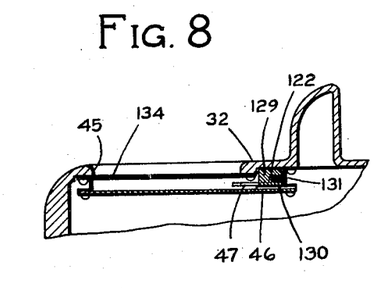
Figure 8 is an enlarged section taken along the line 8—8 of Figure 5.

Thus, as shown in Figure 7, reel 50 comprises side plates 53 and 54 attached respectively to the opposite sides of a core 55 which is slotted in the customary manner to receive one end of the film. The two reel sides are fastened respectively to the annular projections 56 and 57 of a hub 58 which is mounted on a shaft 59 for free rotation relative thereto. One reduced end 59a of this shaft is supported by a bushing 60 mounted in the free end of frame 49, the other end 59b of the shaft being similarly supported by a bushing 61 carried in the upper end of support 48. The extremity of shaft end 59b has secured thereto a drive sprocket 62. Preferably a pair of spacing washers 63 and 64 are disposed respectively between the upper ends of supports 48 and 49 and the adjacent ends of hub 58.

A retainer 65 is mounted on the right-hand end of the enlarged portion of shaft 59 where it is secured, as by a set screw 66, the retainer accordingly rotating with the shaft. A cupshaped spring cage 67 is fastened to reel side 54 as by a screw 68 so as to rotate with the reel and with hub 58. Accordingly it follows that spring cage 67 may rotate relative to retainer 65. One end 69 of a coiled flat spring 70 is anchored to spring cage 67, while the other end of this spring is fastened to a pin 71 carried by retainer 65. It may now be seen that although reel 50 has a running fit on shaft 59, the reel and shaft are nevertheless connected by spring 70. Lower reel 51 (Figure 3) is identical to upper ring 50, except that the spring which connects reel 51 to its shaft is wound oppositely from spring 70. The two reel springs are fully relaxed upon installation. When the film 52 is loaded onto reels 50 and 51, each of the spring retainers, such as retainer 65 (Figure 7) is given approximately two revolutions in opposite directions, each in a direction to preload the spring. Each retainer is then anchored to its shaft by its set screw, e. g. set screw 66. Thus the film is kept under constant tension. It also follows that each spring comprises a resilient driving connection between its shaft and reel so that the springs compensate for the change in speeds of the reels as the film is wound from one to the other, the change in speed, of course, being due to the change in diameter of the roll of film as it builds up on one reel and is stripped off the other.

The shaft on which lower reel 51 is mounted carries a sprocket 72 (Figure 3) similar to upper reel sprocket 62, and about these sprockets is trained a link belt or chain 73. Also meshing with chain 73 is an idler sprocket 74 carried on the end of a pivoted arm 75 which is spring-biased clockwise, as viewed in this figure, thus to maintain chain 73 taut. This chain 73 is also trained about, so as to mesh with still another sprocket 76 which, as will be pointed out hereinafter, drives the indexing director.

FILM DRIVE MECHANISM
*(Figures 3, 4 and 6)*

With reference to Figure 3, a reversible electric motor 77 is mounted in base 20 with its shaft 78 connected as by a coupling 79 to the input shaft 80 of a transmission generally indicated at 81 (see Figure 4). The output shaft 93 of transmission 81 is connected as by a coupling 83 to the shaft (not shown) on which lower reel 51 is mounted, which lower shaft carries the driving sprocket 72 (Figure 3). Thus, as motor 77 operates in one direction or the other, reels 50 and 51 are accordingly driven to run film 52 backward or forward through the optical system.

Figure 6:
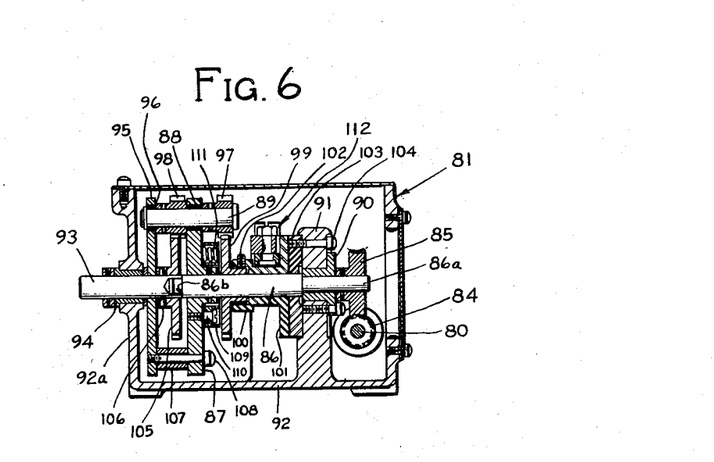
Figure 6 is an enlarged sectional elevation taken along the line 6—6 of Figure 3.

As is more clearly shown in Figure 6, the inner end of transmission input shaft 80 carries a worm 84 which meshes with a worm wheel 85 mounted on the right-hand reduced end 86a of a transmission shaft 86. Pinned to shaft 86 is a pinion support 87 suitably bored to receive a bushing 88 which journals a pinion shaft 89. The right-hand end of shaft 86 is journaled in a flanged bushing 90 mounted in an integral boss 91 of the transmission housing 92 while the left-hand reduced end 86b of shaft 86 is received in the bored out end of a second shaft 93 journaled in a bushing 94 carried in a side wall 92a in the transmission housing. This second shaft 93 carries a second pinion support 95 in which the left-hand end of pinion shaft 89 is journaled as by a bushing 96, support 95 being freely mounted on its shaft.

A pair of pinions 97 and 98 are mounted on and secured to pinion shaft 89 on the opposite sides of pinion support 88. Pinion 97 meshes with a gear 99 which is mounted on shaft 86 but which is secured to the hub 100 of a clutch plate 101 as by a set screw 102. Clutch plate 101 is adapted to engage and disengage a stationary clutch disc 103 which is secured to boss 91 as by a machine bolt 104. It should be noted that gear 99 and clutch plate 101 are rotatable relative to shaft 86 when the plate engages disc 103.

Pinion 98 meshes with a gear 105 which is disposed between pinion supports 88 and 95, and which is pinned to shaft 93 as by pins 106. Pinion supports 88 and 95 are conveniently secured together in constantly spaced relation as by a spacer 107 and machine bolt 108.

A clutch disc 109 is attached to pinion support 88 as by one or more shoulder screws 110, this disc being biased to the right away from the right-hand face of the pinion support as by one or more springs 111. The right-hand face of clutch disc 109 is adapted to be engaged by the left-hand face of gear 99 when the clutch, comprising plate 101 and disc 103, is disengaged, as will be described hereinafter.

From the foregoing description of transmission 81, it may now be seen that when input shaft 80 is rotated, shaft 86 is driven, causing rotation of pinion support 87.

At this point, it should be noted that pinions 97 and 98 are identical as to number of teeth and pitch diameter, whereas gear 99 has one tooth less than gear 105, gear 99 accordingly not being in direct mesh with its pinion 97, but in tooth to tooth contact therewith. Thus it follows that upon rotation of shaft 86, both of the pinion supports 87 and 95 are driven, effecting accordingly a planetary movement of their pinions 97 and 98 about gears 99 and 105, respectively. With the transmission in the condition shown in Figure 6, however, gear 99 is held stationary by reason of the engagement between clutch plate 101 and clutch disc 103, and accordingly as pinion 97 travels around gear 99 it is driven. It follows that when the two pinions 97 and 98 make one complete revolution, gear 105, having one tooth more than gear 99, is advanced one tooth. Therefore to rotate gear 105 one complete revolution, pinions 97 and 98 must make as many turns around gear 99 as there are teeth in gear 105. As gear 105 rotates, shaft 93, of course, rotates with it and there is accordingly afforded a very substantial reduction in speed between input shaft 80 of the transmission and shaft 93 which is the output shaft of the transmission. Hence with the transmission in this condition, sprocket 72 (Figure 3) is driven at a relatively low rate of speed which is, of course, reflected in the rate at which the film travels through the optical system.

When it is desired to drive the film at high speed through the optical system, clutch plate 101 is disengaged from clutch disc 103 as by a conventional clutch lever, generally indicated at 112, in Figure 6, by manually controlled means that will be described hereafter. When the clutch plate and clutch disc are thus disengaged, plate 101 and accordingly gear 99 move to the left axially on shaft 86. Ultimately the left-hand face of gear 99 engages clutch disc 109 and forces it to the left against the push of springs 111 until this clutch disc engages the right-hand face of pinion support 87, thus locking the pinion support and gear 99 together so that gear 99 rotates with shaft 86 and at the same speed. With the gear 99 in this condition, it of course cannot rotate pinion 97, which accordingly locks pinion 98. It follows then that as pinion support 87 continues to rotate, it carries with it the locked pinion 98 which, being in mesh with gear 105, drives this gear and accordingly output shaft 93. Hence a direct drive results and the film is driven at a high rate of speed.

It may then be seen that by controlling transmission 81 in a manner that will be described, the film may be driven at high or low speed. Also, in a manner to be described, the film may be driven at varying rates of speed by controlling the motor speed.

INDEXING DIRECTOR

(Figures 3, 4, 5 and 8)

As was briefly pointed out hereinbefore, the projector includes an indexing director whereby the operator may, by watching the position of pointer 47 (Figure 5) on card 46, determine what portion of the film is being projected. This pointer is driven in synchronism with film 52 (Figure 3) in a manner that will now be described.

As shown in Figure 4, a base plate 113 is secured to supporting frames 48 and 49, bridging the space therebetween. At the opposite ends of plate 113 are secured bearing blocks 114 and 115 which rotatably support a lead screw 116 on which is mounted a traveling nut 117. The left-hand end of lead screw 116 extends through bearing block 114, and it is this end of the lead screw that carries sprocket 76 (see also Fig. 3). A bracket 118 is secured in any suitable manner to base plate 113, and rotatably mounts in a portion 118a thereof a headed shaft 119 to which is secured a worm wheel 120 which meshes with lead screw 116 (Figure 4). On the outer end of shaft 119 is mounted a drum 121 to which one end of a wire rope 122 is attached. Plate 113 supports a pair of limit switches 123 and 124, the former of which is stationary and the latter of which may be adjustably fixed to plate 113 within the limits of a slot 125 cut in the base plate. Nut 117 is cut away as at 117a to allow the nut to pass under worm wheel 120 as it travels from one end of lead screw 116 to the other. It may now be seen that lead screw 116 coacts with limit switches 123 and 124 to break the circuit of motor 77 when one end or the other of the film is approached, to preclude the possibility of detaching either film end from its reel.

At this point it might be well to note that preferably each end of the film is provided with a blank leader of illustratively three feet, which is sufficient to absorb any extra rotation of the film reels due to momentum of the reels and driving mechanism after the motor current has been cut. As noted, limit switch 124 is adjustable along the lead screw 116, thus to enable the film reels to accommodate any length of film between minimum and maximum amounts, e. g. 80' and 160'.

Wire rope 122 leads from drum 121 and is trained over a pair of suitably mounted pulleys 126 and 127 (see also Figure 5). From pulley 127 the wire rope 122 is trained over a third pulley 128 and passes through a hole in a block 129 (Figure 8) to which pointer 47 is attached. Wire rope 122 is secured to the block as by a set screw 130, the block being guided by the front of panel 32, indexing card 46 and a guide strip 131. Wire rope 122 (Figure 5) extends through pointer block 129 and has its end fastened to a drum 132 which is spring-biased as by a spring 133 in a counterclockwise direction so as always to maintain the wire rope under tension.

Thus, with reference to Figures 4 and 5, it may be seen that when film 52 is driven in such a direction as to cause drum 121 to pay off wire rope 122, the spring tensioned drum 132 (Figure 5) takes up the wire rope as it is payed off, the result being that pointer 47 is carried downwardly of directory card 46. When the film 52 (Figure 4) is driven in the opposite direction, drum 121 is oppositely rotated to take up the wire rope 122 which accordingly is drawn from drum 132 (Figure 5), the result being that pointer 47 travels upwardly. It may accordingly be seen that the operator can readily determine that portion of the film which is being projected on the screen at any time regardless of the speed at which the film is moving.

Drum 121 and card 46 are replaceable in order that any length of film 52 between the minimum and maximum amounts of film that the projector can accommodate may be synchronized with its respective card 46 and pointer 47. Thus a drum 121 with a large diameter will cause pointer 47 to travel the length of card 46 for a shorter total length of film, whereas a small diameter drum 121 will cause pointer 47 to travel the same distance for a longer total length of film, inasmuch as the larger diameter drum will accommodate more wire rope per revolution.

It should be noted that panel aperture 45 (Figure 8) is preferably closed by a transparent shield 134 which is fastened to the inside of the panel, preferably by a dust-proof bonding agent.

OPTICAL SYSTEM AND FILM GUIDE

Figure 10:
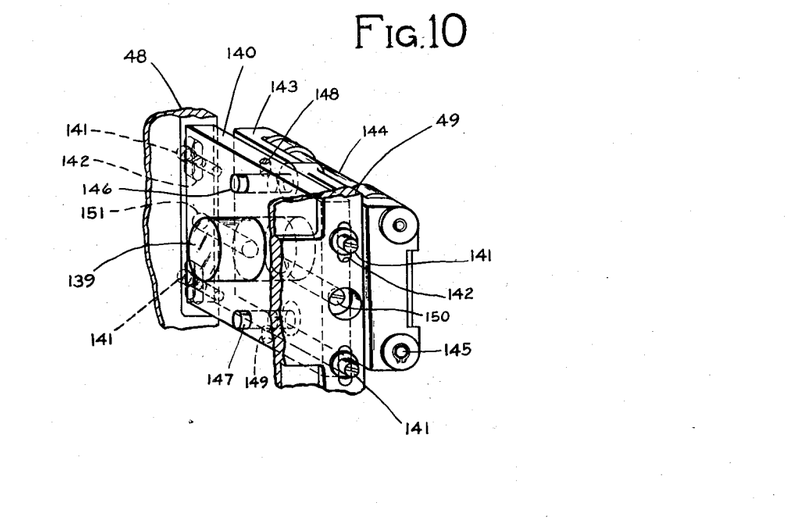
Figure 10 is a fragmentary perspective view of the film roller bracket and lens holder block; and, Figure 11 is a schematic view of the control system of the projector system of the projector showing the major parts thereof along with the circuits therefor.

(Figures 3, 4 and 10)

As has been noted hereinabove, the optical system preferably includes a lens of short focal length capable of effecting a magnification of the order of 10 to 1 on a screen whose area is of the order of 80 square inches.

The optical system includes a lamp 135 and reflector 136 (Figure 3) disposed in lamp housing 37, a condenser lens 137 adjustably mounted in a bracket 138 attached to frame supports 48 and 49 (Figure 4) and a projector lens 139 adjustably mounted in a lens block 140 (see Figure 10). The width of lens block 140 is less than the distance between frame supports 48 and 49 between which the lens block is disposed. The block is adjustably held between the supports by means of screws 141 which extend through slots 142 in supports 48 and 49 and into block 140. Disposed between lens block 140 and condenser bracket 138 (Figure 3) is a film roller frame 143 which rotatably carries upper and lower rollers 144 and 145, respectively. As best shown in Figure 3, it is over these rollers 144 and 145 that the film travels in either of its directions of movement.

Referring back to Figure 10, frame 143 has secured thereto and extending therefrom a pair of pins 146 and 147 which are slidably received in appropriate holes formed in the upper and lower central portions of lens block 140. These pins may be held in adjusted set position by set screws 148 and 149, respectively, which are threaded into the lens block in such manner as to be engageable with their respective pins. Thus it follows that for focusing purposes these set screws may be loosened and frame 143 adjusted relative to block 140 until the desired focus is obtained, whereupon the two set screws may be set to hold the frame in proper position. By the same token, through the manipulation of screws 141, lens block 140 may be adjusted laterally or vertically of supports 48 and 49 to obtain the proper register of the projected image on the projector screen. Lens block 140 also carries a pair of adjusting screws 150 and 151 which may be loosened to permit adjustment of the projector lens 139 and then taken up to hold the lens in its adjusted position. The combination of these various adjustments accordingly provides a wide range of movement for proper focus and register of the image of the film on the screen.

It is desirable to maintain film 52 perpendicular to lens 139 and to prevent distortion of the projection of the image on the screen at the time of projection. To this end, frame 143 has mounted thereon a transparent plate 152 against which the film is adapted to be pressed flat by a pressure plate 153 (see also Figure 4). This pressure plate is mounted on a pair of headed studs 154 and 155 which extend through the plate into frame 143, springs 156 and 157 being interposed between the pressure plate and the heads of studs 154 and 155, respectively, to force the pressure plate toward the frame and accordingly against transparent plate 152 (Figure 3). Referring back to Figure 4, a solenoid 158 is fastened to the side of frame support 49, and to its armature is attached a rod 159 whose free end is engageable with the extended end 153a of pressure plate 153. As will be described hereinafter, when the operator brings the film to rest position, solenoid 158 is automatically deenergized, thus permitting springs 156 and 157 to force pressure plate 153 against the film and flatten it against transparent plate 152.

MANUAL CONTROL
(Figures 1, 3, 4, 5 and 11)

As shown in Figure 1, panel 32 is recessed as at 160, and in this recess is disposed a control handle 161 which may be turned up or down, as indicated by the arrows, to effect corresponding movement of the film. Handle 161 is mounted on the outer end of a shaft 162 (Figure 3), the inner end of this shaft being journaled in a bracket 163 secured to and extending upwardly from base 20. Near the outer end of shaft 162 (Figure 5) is attached a centering lever 164 to which is secured the upper end of a spring 165, the lower end of this spring being fastened to base 20. The spring accordingly always urges lever 164 to the Figure 5 neutral position, to bring handle 161 (Figure 1) to its horizontal or neutral position wherein the projector is at rest.

To the inner end of shaft 162 (Figure 3) is secured a gear 166 which meshes with a pair of gears 167 and 168. Gears 167 and 168, however, do not mesh (see Figure 11). Gear 167 (Figure 3) is mounted on a shaft 169 journaled in bracket 163, and the right-hand end of this shaft carries a cam 170, which is so contoured as to engage and actuate clutch lever 112 to shift transmission 81 to direct drive when high speed transport of the film is desired.

Gear 168 (Figure 4) is secured to one end of a shaft 171 mounted in bracket 163. The other end of this shaft is secured to the arm 172 (Figure 11) of a rheostat 173 by which the speed of motor 77 is controlled, as will be described.

Figure 11:
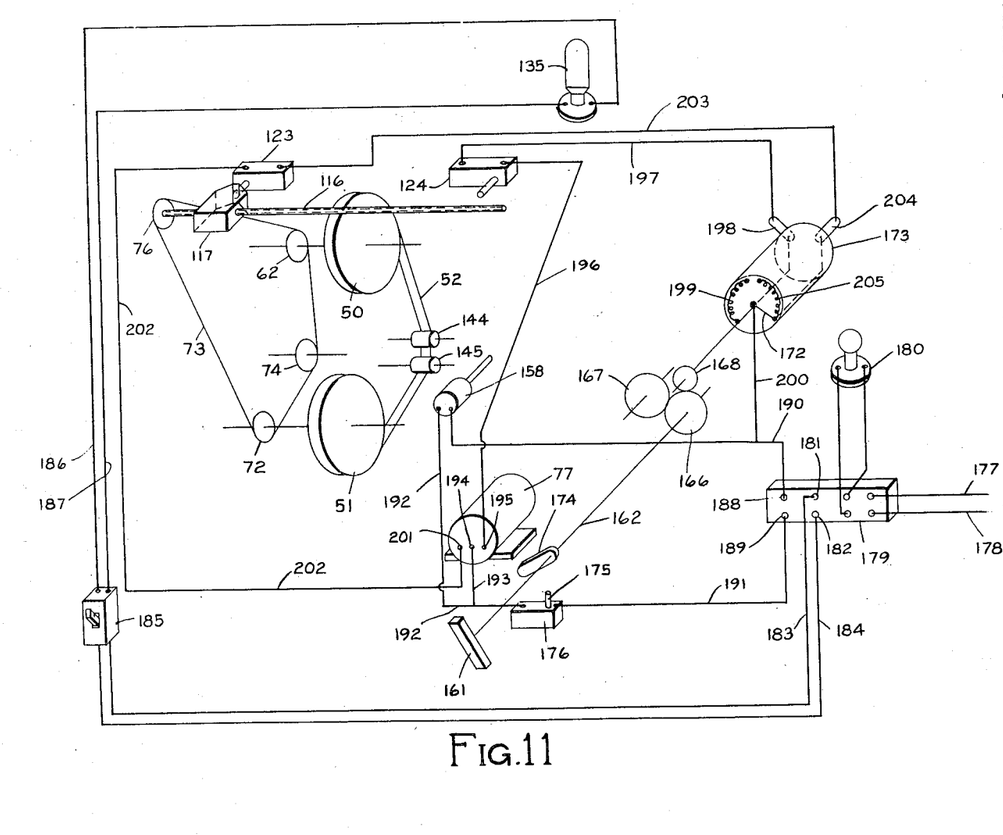

As shown in Figures 3, 4 and 11, shaft 162 has secured thereto a switch arm 174 which is adapted to engage the button 175 of a microswitch 176 when control handle 161 is turned from its neutral (Figure 1) position. Thus handle 161 controls not only the direction of operation of motor 77 and the speed thereof, but also the operative condition of transmission 81, thus giving the operator of the projector complete discretion as to the speed with which the film is transported, all as will be described hereinbelow in connection with the operation of the projector.

OPERATION
(Figures 3 and 11)

The wiring diagram of the projector circuit is shown in Figure 11 and includes a pair of leads 177 and 178 running from the power supply to a terminal block 179. Also connected across the terminal block is a low voltage cowl light 180. Terminal block 179 includes terminals 181 and 182 to which are respectively connected leads 183 and 184 leading to a time delay switch 185. This switch is in turn connected by leads 186 and 187 to the opposite sides of projector lamp 135. Time delay switch 185 is of such nature as automatically to break the circuit to lamp 135 after a predetermined period of time, for example, three minutes, to avoid the creation of excessive heat within the projector. Lamp 135 may be reenergized by operating switch 185.

A further pair of terminals 188 and 189 on terminal block 179 have attached thereto leads 190 and 191. Lead 190 is connected to one side of solenoid 158, the other side of this solenoid being connected as by a lead 192 to one side of switch 176. Lead 191 is connected to the other side of switch 176. Lead 192 is connected by a lead 193 to one terminal 194 of motor 77. A second terminal 195 of motor 77 is connected by a lead 196 to one side of adjustable limit switch 124, the other side of this switch being connected as by a lead 197 to a terminal 198 of rheostat 173. This terminal of the rheostat is electrically connected to resistance 199 which, when engaged by arm 172, is connected to lead 190 by a lead 200.

The third terminal 201 of motor 77 is connected by a lead 202 to one side of stationary limit switch 123, the other side of this switch being connected by a lead 203 to the second terminal 204 of rheostat 173. This rheostat terminal is connected to the other resistance 205 of the rheostat which, when engaged by arm 172, is connected to lead 190 by lead 200.

In Figure 11, the control system of the projector is shown set at a position in which the film is at the end of its upward travel, i. e. all the film is wound on reel 50. In this position the traveling nut 117 has opened the normally closed limit switch 123, breaking the circuit between motor 77 and rheostat resistance 205. This shuts off power to the motor, leaving the film motionless. When control handle 161 is brought back from its Figure 11 position to its neutral position, it engages switch button 175, opening switch 176, and again breaking the circuit to motor 77, regardless of the position of traveling nut 117.

It accordingly follows that when control handle 161 is turned clockwise from its neutral position, wherein, incidentally, rheostat arm 172 is centered between the upper ends of rheostat resistances 199 and 205, switch 176 closes and rheostat arm 172 engages resistance 205 to establish the following circuit: power line 178, terminal 189, lead 191, switch 176, lead 192, lead 193, motor terminal 194, motor terminal 201, lead 202, switch 123, lead 203, rheostat terminal 204, resistance 205, arm 172, leads 206 and 190 to terminal 188 and thence to the other power line 177. Thus motor 77 is energized to drive the film in one direction. With rheostat arm 172 at the top of resistance 205, the film is driven at its lowest or tracking speed, it being recalled that the full reduction of transmission 81 is effective at this time. As handle 161 is turned clockwise, however, less and less of resistance 205 is included in the motor circuit, and accordingly the motor speed increases. When arm 172 reaches its Figure 11 position, it is connected directly across the power lines. Also at this time cam 170 (Figure 4) has been rotated by shaft 162 and gears 166 and 167 a sufficient amount to shift clutch lever 112 sufficiently to disengage clutch disc 101 (Figure 6) and clutch plate 103 which effects a direct drive through transmission 81. Accordingly the film is driven at top speed.

Regardless of the speed at which the film is driven, if the film is driven in one direction a sufficient length of time, traveling nut 117 (Figure 11) will eventually engage one or the other of limit switches 123 and 124, depending upon the direction in which the motor is running. When either of these switches is thus engaged, e. g. switch 123, the motor circuit is broken and the mechanism accordingly stops.

Also, when the operator centers control 161 to its neutral position, switch 176 is opened to deenergize not only motor 77 but also solenoid 158. This solenoid is, of course, energized while the motor is running and accordingly holds pressure plate 153 (Figure 4) away from film 52. When, however, switch 176 (Figure 11) opens, the solenoid circuit is also broken, allowing springs 156 and 157 (Figure 4) to force pressure plate 153 against the film to press the film against transparent plate 152 (Figure 3).

Accordingly it may be seen that we have provided a projector which attains the aforementioned objects in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

We claim:

1. A picture projector comprising, in combination, a base, a pair of uprights mounted on said base and extending upwardly therefrom, a pair of spaced shafts rotatably mounted by said uprights, driving means mounted on said base, means forming a chain and sprocket driving connection between said driving means and said shafts, whereby said shafts are positively driven upon operation of said driving means, a pair of reels carried respectively by said shafts for rotation relative thereto, and means forming a resilient driving connection between each shaft and its associated reel, whereby a film mounted on said reels is kept under constant tension and whereby the varying diameters of the film loads on the respective reels are automatically compensated as the film is wound from one reel to the other under the impetus of said driving means and its positive driving connection with said shafts.

2. A projector according to claim 1 wherein the driving means includes a reversible motor and a speed change transmission, whereby said film may be driven in opposite directions and at different speeds.

3. A projector according to claim 1 wherein the resilient driving connection means between each shaft and its associated reel includes a retainer which is secured to the shaft, a spring cage which is secured to the reel, and a coiled spring having its opposite ends connected respectively to the retainer and the cage.

4. A picture projector comprising, in combination, a housing, a pair of film supporting reels rotatably mounted in said housing, means for driving said reels including a reversible motor and a transmission, said transmission including change speed mechanism and an operating element therefor, motor control means for controlling both speed and direction of operation of said motor, and means associated with said transmission operating element and said motor control means for shifting said transmission at a predetermined point in the operation of said motor control means.

5. A projector in accordance with claim 4 wherein said transmission element comprises a lever and its associated operating means includes a cam which is connected to and driven by said motor control means.

6. A projector in accordance with claim 4 wherein said motor is a reversible electric motor, and the motor control means includes a rheostat and a switch in the motor circuit and also a manually operable control handle by which to operate said rheostat, thereby to control the speed and direction of operation of said motor, and means operated by said control handle for operating said switch thereby to start or stop said motor.

7. A film projector comprising, in combination, a housing including a viewing window, means forming with a portion of said housing a guide track for slidably supporting an indicating finger, an indicating finger slidably mounted in said guide, film supporting and driving means in said housing, means in said housing for driving said film supporting and driving means, means forming a driving connection between said driving means and said finger for moving said finger along its track during the operation of the film supporting and driving means, thereby to indicate which portion of the film is in projection position, said driving connection for said finger including a drum, a cable having one end connected to said drum and the other end connected to said finger, a second cable having one end connected to said finger, and cable take-up means mounted in said housing and having the other end of said second cable connected thereto for taking up said second cable in one direction of operation of said finger and for paying off said second cable during the other direction of operation of said finger.

8. A film projector comprising, in combination, a housing including a viewing window, means forming with a portion of said housing a guide track for slidably supporting an indicating finger, an indicating finger slidably mounted in said guide, film supporting and driving means in said housing, means in said housing for driving said film supporting and driving means, and means forming a driving connection between said driving means and said finger for moving said finger along its track during the operation of the film supporting and driving means, thereby to indicate which portion of the film is in projection position, said driving connection between said finger and said driving means including a drum which is detachably connected to said driving means, whereby drums of different diameter are selectively installable in accordance with the length of film to be projected, thereby to synchronize the operation of said finger with said film.

9. A film projector comprising, in combination, a housing including a viewing window, means forming with a portion of said housing a guide track for slidably supporting an indicating finger, an indicating finger slidably mounted in said guide, film supporting and driving means in said housing, means in said housing for driving said film supporting and driving means, means forming a driving connection between said driving means and said finger for moving said finger along its track during the operation of the film supporting and driving means, thereby to indicate which portion of the film is in projection position, said driving means including a reversible electric motor and the driving connection between said driving means and said finger including a lead screw and a nut, and a pair of limit switches connected in series with said motor and adapted to be opened by said nut when said nut reaches either limit of its travel, thereby to deenergize said motor.

10. A projector comprising, in combination, a housing, film supporting means operatively mounted in said housing and comprising a pair of reels adapted to support a length of strip film, means to drive said reels and thereby pay off film from one and take it up on the other, a film guide, means adjustably mounting said film guide in said housing, a transparent fixed plate secured to said guide, a pressure plate operatively associated with said guide in juxtaposition with said transparent plate, means responsive to cessation of operation of said reel driving means to move said pressure plate toward said transparent plate and grip that portion of the film therebetween that is to be projected, said film driving means including an electric motor and said pressure plate moving means including a solenoid, and circuit means for said motor and said solenoid for deenergizing said solenoid upon deenergization of said motor, said solenoid being so connected to said pressure plate as to move it away from said film guide upon energization.

11. A projector in accordance with claim 10 wherein a spring is connected to said pressure plate to drive it against said film guide upon deenergization of said solenoid.

JACK VAN H. WHIPPLE.
GERALD P. KAMMERER.

REFERENCES CITED

The following references are of record in the file of this patent:

UNITED STATES PATENTS

| Number | Name | Date |
|---|---|---|
| 1,889,575 | Sebille | Nov. 29, 1932 |
| 2,008,982 | Hopkins | July 23, 1935 |
| 2,037,705 | Chapman | Apr. 21, 1936 |
| 2,076,853 | McClure | Apr. 13, 1937 |
| 2,279,463 | Hopkins | Apr. 14, 1942 |
| 2,323,787 | Bitner | July 6, 1943 |
| 2,332,810 | Place | Oct. 26, 1943 |